United States Patent
Ravilisetty (10) Patent No.: US 6,660,186 B2
(45) Date of Patent: Dec. 9, 2003

(54) METHOD OF MAKING BLUE EMITTING ALUMINATE PHOSPHOR FOR VUV EXCITED LIGHT EMITTING DEVICE

(75) Inventor: Padmanabha Rao Ravilisetty, Highland, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 66 days.

(21) Appl. No.: 10/001,622

(22) Filed: Oct. 31, 2001

(65) Prior Publication Data

US 2003/0122108 A1 Jul. 3, 2003

(51) Int. Cl.$^7$ .......................... C09K 11/80; C09K 11/55

(52) U.S. Cl. ............................................ 252/301.4 R

(58) Field of Search ................... 252/301.4 R (56) References Cited

U.S. PATENT DOCUMENTS

| | | | |
|---|---|---|---|
| 3,294,699 A | 12/1966 | Lange | 252/301.4 |
| 3,458,451 A | 7/1969 | Kobayashi et al. | 252/301.4 |
| 3,577,350 A | 5/1971 | Amster | 252/301.4 |
| 4,110,660 A | 8/1978 | Wolfe | 313/486 |
| 4,161,457 A | 7/1979 | Takahashi et al. | 252/301.4 |
| 4,216,408 A | 8/1980 | Verstegen et al. | 313/486 |
| 4,249,108 A | 2/1981 | Wolfe | 313/486 |
| 4,441,049 A | 4/1984 | Verstegen et al. | 313/486 |
| 4,590,405 A | 5/1986 | Hoeks et al. | 313/486 |
| 4,795,588 A | 1/1989 | Pet et al. | 252/301.4 |
| 5,350,971 A | 9/1994 | Jeong | 313/487 |
| 5,358,734 A | 10/1994 | Lenox et al. | 427/71 |
| 5,611,959 A | 3/1997 | Kijima et al. | 252/301.4 |
| 5,879,586 A | 3/1999 | Kitamura et al. | 252/301.4 |
| 6,045,721 A | 4/2000 | Zachau et al. | 252/301.4 |

FOREIGN PATENT DOCUMENTS

| | | | |
|---|---|---|---|
| EP | 0287167 A1 | 10/1988 | C09K/11/80 |
| EP | 0418902 A2 | 3/1991 | H01J/61/44 |
| EP | 0529956 A1 | 3/1993 | C09K/11/80 |
| JP | 8-115673 | 5/1996 | H01J/17/04 |
| WO | WO 99/24999 | 5/1999 | H01J/11/02 |
| WO | WO 99/34389 | 7/1999 | H01J/17/49 |

OTHER PUBLICATIONS

Sommerdijk et al., "The behaviour of phosphors with aluminate host lattices." Philips Technical Review, vol. 37, No. 9/10, 1977, pp. 221–233.

(List continued on next page.)

Primary Examiner—C. Melissa Koslow
(74) Attorney, Agent, or Firm—Ohlandt, Greeley, Ruggiero & Perle, LLP

(57) ABSTRACT

Small size particle blue emitting divalent europium activated alkaline earth aluminate phosphors with or without lanthanum are produced by thermal decomposition of gel powders comprising alkaline earth, lanthanum and europium salts and an organic precursor such as aluminum isopropoxide or aluminum s-butoxide at a temperature below the solid-state reaction (SSR) temperature. The phosphor of the present invention has the empirical formula:

$(AE_{2-x-y}La_xEu_y)Al_{10}O_{17}$

Wherein: AE=Ba, Sr, Ca or Mg, $0 \leq x \leq 1$ and $0.01 \leq y \leq 0.1$ having a band emission in blue region, peaking around 450 nm when excited by 147 or 173 nm radiation from Xenon gas mixture. The phosphor obtained by the present method, having uniform particle size distribution (0.05–5 microns), is appropriate for thin phosphor screens required for a variety of flat panel display and lamp applications. These phosphors also exhibit better stability when excited with 147 and 173 nm radiation than the currently available commercial phosphors for plasma display panels.

31 Claims, 4 Drawing Sheets

U.S. PATENT DOCUMENTS

| | | |
|---|---|---|
| 6,096,243 A | 8/2000 | Oshio et al. ............ 252/301.4 |
| 6,117,362 A | 9/2000 | Yen et al. ............... 252/301.4 |
| 6,180,029 B1 | 1/2001 | Hampden-Smith et al. ...................... 252/301.4 |

OTHER PUBLICATIONS

Ronda et al. "Chemical composition of and $Eu^{2+}$ Luminescence in the Barium Hexaaluminates." J. Electrochem. Soc., vol. 136, No. 2, Feb. 1989, pp. 570–573.

Oshio et al. "Mechanism of luminescence decrease in $BaMgAl_{10}O_{17}$:$Eu^{2+}$ Phosphor by oxidation." J. Electrochem. Soc., vol. 145, No. 11, Nov. 1998, pp. 3903–3907.

Oshio et al. "Mechanism of particle growth of a $BaMgAl_{10}O_{17}$:$Eu^{2+}$ Phosphor by firing with $AlF_3$" J. Electrochem. Soc., vol. 145, No. 11, Nov. 1998, pp. 3898–3902.

Yang et al., "Morphology control of $BaMgAl_{10}O_{17}$:Eu particles: The use of colloidal solution obtained from Alkoxide precursor in spray pyrolysis." J. Electrochem. Soc., vol. 147 (2) 799–802 (2000).

Golego et al. "Thin–film $BaMgAl_{10}O_{17}$:$Eu^{2+}$ prepared by spray pyrolysis." J. Electrochem. Soc., vol. 147, No. 5, 2000, pp. 1993–1996.

METHOD OF MAKING BLUE EMITTING ALUMINATE PHOSPHOR FOR VUV EXCITED LIGHT EMITTING DEVICE

FIELD OF THE INVENTION

This invention relates to the development and synthesis of divalent europium activated alkaline earth and/or lanthanum aluminate phosphor particles having a uniform particle size distribution (0.05–5 μm) and a method of forming such particles. More specifically, this invention relates to a development and method of formation of such particles from respective oxides, nitrates and organic precursors which form small particles that improve the stability, longer life time and good color saturation as required for flat panel display (FPD) and lamp applications.

BACKGROUND OF THE INVENTION

Divalent europium ($Eu^{2+}$) activated barium magnesium aluminate (BAM) phosphor, is currently used in plasma display panels (PDP) as a blue emitting component. When compared with other phosphors used for red and green, BAM phosphor exhibits lower lifetime with the vacuum ultraviolet (VUV) flux. Efforts are being made to improve the existing BAM or to develop new phosphors to satisfying all requirements.

U.S. Pat. No. 3,294,699 discloses the invention of BAM as a blue phosphor. According to U.S. Pat. No. 4,110,660, the blend containing $BaF_2$, LiF, $Al(OH)_3$ and $Eu_2O_3$ was fired in a $H_2$ atmosphere in the temperature range of 1400° C.–1650° C. for a period of 3 to 6 hours to obtain blue emitting divalent europium activated barium-lithium aluminate phosphor, used in xerography lamps. Koichi Takahashi et al. proposed BAM phosphor as a high radiation blue emitting phosphor under excitation by vacuum ultraviolet rays having the wavelength shorter than 200 nm in U.S. Pat. No. 4,161,457. The above said BAM was prepared by calcinating respective metal salts such as carbonates, nitrates, sulfates or halides at temperatures in the range 1200° C.–1600° C. in two different firing cycles. U.S. Pat. Nos. 5,989,454 and 6,187,225 are directed to blue phosphors.

Multi-phase structured $Eu^{2+}$ activated La, Mg aluminate phosphor exhibited improved brightness over prior art single-phase compositions (U.S. Pat. No. 4,249,108). Starting materials ($La_2O_3$, MgO, $Al(OH)_3$ and $Eu_2O_3$) were fired at 1500° C.–1650° C. for 1–5 hours in a reducing atmosphere (75 vol. % $H_2$, 25 vol. % of. $N_2$). The prior art also reveals that Ba (up to 25%) can be replaced by Sr (U.S. Pat. No. 4,590,405). Kijima et al. synthesized aluminate phosphor comprising (a) at least one element selected from the group consisting of Ba, Sr and Ca, (b) Eu, (c) Mg and/or Zn, (d) optionally Mn and (e) Al by firing the respective oxides and/or hydroxides in a reducing atmosphere at a temperature of from 1200° C.–1700° C. over a period of 2–40 hours (U.S. Pat. No. 5,611,959).

A method of producing BAM without any fluoride compound (flux) in the starting ingredients was described in U.S. Pat. No. 5,879,586. According to this invention, the particle diameter (1–20 μm) and shape of the particles could be controlled by firing the samples in a reducing atmosphere at higher temperatures (1600° C.–2000° C.). European Patent 0 418 902 A2 teaches the role of alkaline earth and zinc in europium activated BAM in three component phosphor blends in controlling the fluorescent lamp performance.

According to Japanese Patent (8115673), $BaMgAl_{10}O_{17}$:Eu2+ has better time-wise durability when compared to traditional $BaMgAl_{14}O_{23}$:$Eu^{2+}$. This particular phosphor was synthesized by calcinating a barium compound (such as BaO, $Ba(OH)_2$, $BaCO_3$, etc), an europium compound (such as $Eu_2O_3$, $EuF_3$, etc.), a magnesium compound (such as MgO, $Mg(OH)_3$, $Mg(CO_3)_4$, $Mg(OH)_2.5H_2O$, etc.), an aluminum compound ($Al_2O_3$, $Al(OH)_3$, etc.) and a flux (fluorides of Ba, Al or Mg), at least once for 2–40 hours at 1200–1700° C. in a reducing atmosphere in the presence of steam. For better stability (maintenance) of BAM in plasma display applications, Zachau (WO 99/34389) suggested manganese as a co-activator along with europium in BAM.

The main application of large area plasma displays will be High Definition Television (HDTV) and high information content presentation. HDTV and similar types of display devices should have phosphors with high resolution and high brightness for high performance. This can be achieved only with thin phosphor screens consisting of small phosphor particles in a close rib structure or closed cell structure. Screens with small particles exhibit higher packing density and also need reduced binder content. Stability is another concern in selecting a phosphor. The degradation of phosphor should not be more than 10% before 10,000 hours of operation. Three phosphors (red, green and blue) currently used in PDP's do not exhibit same lifetime (stability) and particle morphology. Due to their physical nature, all of the three phosphors need different rheology of phosphor paste as well as different screening processes. In PDP applications these phosphors exhibit different life times. Blue phosphor degrades very fast when compared to other green and red phosphors. With the operation, the color point (color coordinates) of blue phosphor (BAM) shifts towards green. This result compromises the performance of the display. In consideration of these problems, we have dedicated our efforts to improve the existing phosphors or develop new phosphors.

SUMMARY OF THE INVENTION

Accordingly, it is an objective of the present invention to provide a method of preparation of divalent europium activated alkaline earth aluminate with or without lanthanum phosphor having the empirical formula:

$(AE_{2-x-y}La_xEu_y)Al_{10}O_{17}$

Wherein: AE=Ba, Sr, Ca, or Mg, $0 \leq x \leq 1$ and $0.01 \leq y \leq 0.1$.

The present invention compares the synthesis of europium activated alkaline earth aluminate phosphor with or without lanthanum by two different processes: a conventional solid-state reaction process and a sol-gel process. Depending upon the required particle size distribution, the sol-gel process is superior for preparing small particles (0.05–5 microns) and the solid-state reaction is for normal size particles (5–20 microns).

The sols are dispersions of colloidal particles in a liquid. The gravitational forces on the particles are negligible. From a sol, a gel is formed with an interconnected, rigid network, having sub-micrometer pores and a polymeric chain whose average length is of the order of microns. The particle size of the finished product is a function of the initial concentration of the starting sols, gelation process, drying of gels, calcination temperature and rate of cooling.

Sol-gel process offers many advantages over conventional methods in the synthesis of fine powders and particularly phosphor materials. Since all of the starting materials are mixed at the molecular level in a solution, a high degree of homogeneity is achievable. Doping of impurities (activators/co-activators/sensitizers) through solutions is straightforward, easy and effective. The pores in properly dried gels are often extremely small and the components of a homogenous gel are intimately mixed. The surface area of powders produced from sol-gel is very high, leading to lower processing temperatures.

Phosphor materials are extremely sensitive to impurities; even in ppb levels, the low-temperature process through a sol-gel process minimizes the potential for cross contamination. Some of the unwanted impurities left in the materials from conventional methods (high temperature solid state reaction) may pose a threat to the performance of a phosphor. As the size of the phosphor particle decreases, the probability of electron and hole capture to the impurity increases and the e-h localization enhances the recombination rate via the impurity. The optimum impurity concentration (activator) level can be further increased with small particle size. The present invention is related to the growth of $Eu^{2+}$ doped alkaline earth aluminate phosphor with or without lanthanum by sol-gel methods.

More specifically, the present invention provides compositions and a process for forming a $Eu^{2+}$ doped alkaline earth aluminate phosphor with or without lanthanum having the empirical formula:

Wherein: AE=Ba, Sr, Ca, or Mg, $0 \leq x \leq 1$ and $0.01 \leq y \leq 0.1$ (1) reacting a dilute solution comprising a source of an alkaline earth, a source of lanthanum, a source of europium and an organic precursor providing a source of aluminum, in an acid medium to form a dilute gel (sol-gel process);

(2) converting the dilute gel into a xerogel powder (room temperature drying) or converting the dilute gel into an aerogel powder (vacuum drying); or converting the dilute gel into a gel powder (spray drying); and, (3) thermally decomposing the powders obtained from the above, at specified temperatures.

BRIEF DESCRIPTION OF THE DRAWINGS

FIG. 2 illustrates scanning electron micrographs of $Eu^{2+}$ activated barium magnesium aluminate phosphors prepared from a) xerogel, b) aerogel, c) spray dried powder and d) oxides and nitrates (solid state process).

DETAILED DESCRIPTION OF THE INVENTION

There are a number of display applications where a blue phosphor with better stability and longer life would significantly improve the display's performance. The blue component is very important, as it improves the color temperature of the display. The small size phosphor particles are particularly suitable for use in applications in which a high packing density is required. The result of this development effort is the basis of the present invention.

This invention provides a method of synthesizing alkaline earth aluminate phosphors with or without lanthanum incorporating high concentrations of activator ion ($Eu^{2+}$). The formation of the alkaline earth aluminate solid solution is critical and is highly dependent on the reaction temperature and conditions.

In a solid-state reaction, respective oxides or fluorides or carbonates or nitrates or sulfates are reacted at higher temperatures in the presence of a flux (example $LiF_3$). At these temperatures, proper doping of impurity ions into the lattice of the complex is uncertain. Finally, the high temperature process (>1500° C.) will lead to growth of uneven and larger particles. The life of the furnace and crucibles is drastically reduced due to the corrosiveness of fluorine (flux) compounds.

In this invention, an aqueous based process is adopted by considering the cost and availability of the starting chemicals. Since the purity of starting chemicals is very important to the synthesis of phosphors, the starting chemicals are typically 99.9–99.999% in purity [it is important to minimize the concentration of specific contaminants (Fe, Co, Ni, etc.) which can seriously degrade the phosphor performance].

Required metal (Ba, Ca, Sr, Mg and La and Eu) solutions are also prepared by mixing appropriate amounts of respective metal nitrates in a lukewarm Dl water to obtain 0.05–0.1M solutions. The metal hydroxide precursor was prepared by precipitating an aqueous solution of metal chloride or metal nitrate (0.01–0.05M) in water by the addition of a base such as ammonium hydroxide to the solution. Stoichioemetric quantities of metal solutions and aluminium isopropoxide or aluminum s-butoxide are mixed. The metal/isopropoxide or aluminum s-butoxide solution is transferred to a round bottom flask and peptized at 80–100° C. for 9–18 hours in a stirrer mantle. In the present invention inorganic acid such as $HNO_3$ or HCl have been employed to maintain a low pH which is required to effect gelation.

Preferably, the phosphor complex of the method of the present invention comprises from about 1.9 moles to about 1.99 moles of alkaline earth metal, from about 0.01 moles to about 0.1 moles of europium, and about 10.0 moles of aluminum.

After the pepitization, sol/gels are left in a container until they become a thick gel (3–5 days) and then a xerogel. Aerogels are also prepared from the same dilute gels by extracting the water and other solvents in a vacuum through a cold trap. These xerogels or aerogels are transferred into a lab oven at 60–70° C. and left for a day or until becoming powder. This step is inserted to accelerate the removal of any resisdual solvent. Gel powders are also prepared by spray drying. Dilute gels are sprayed through a fine nebulizer into a 4" diameter glass tubing which has been heated to 120–150° C. An alternate process for forming particles can be accomplished using an ultrasonic aersol generator. After drying, gel powder is collected from the tube. These powders are transferred into a high grade alumina crucible and subjected to two heat cycles. In the first heat cycle, the sample is soaked for 2 hours at 400° C. to burn-out residual organic components and then heated to 900–1000° C. for 3–6 hours to form the respective oxide. In the second heat cycle, powder samples are reheated to 1000–1200° C. in a forming gas ($5\%H_2+95\%N_2$) for 2 to 4 hours to reduce $Eu^{3+}$ to $Eu^{2+}$ and also to improve the crystallinity of the product. After cooling to room temperature, the aggregate mass is crushed gently (eg., in a mortar and pestal). The crushed powder is then washed with deionized water and dried at 100° C. for 4 to 6 hours to remove very small particles (<0.05 microns) and any extranious soluable component.

Very small particles can also be eliminated by rolling the phopshor in a diluted acid (HCl or $HNO_3$) for several hours (12–24 hrs) and washed throughly with DI water.

Figure 1:
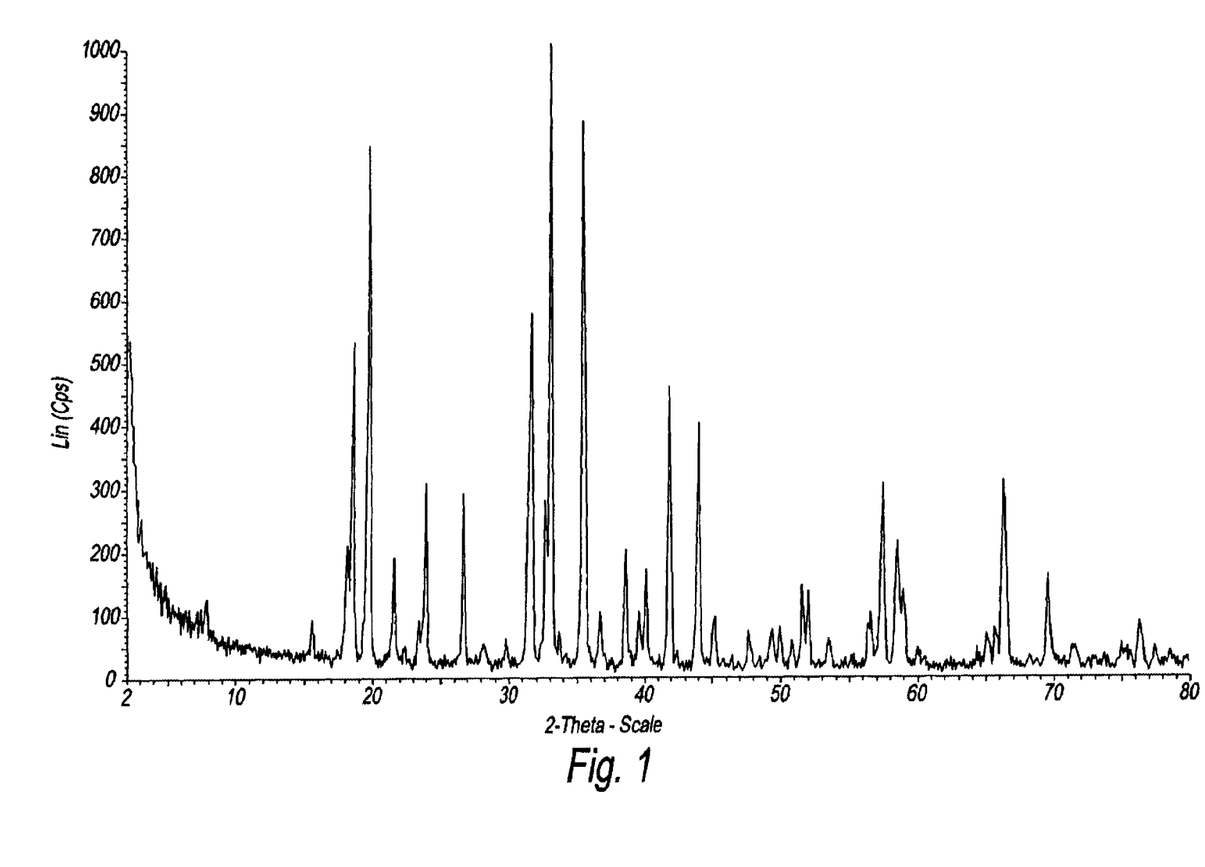
FIG. 1 shows X-ray diffraction pattern of $Eu^{2+}$ activated barium magnesium aluminate phosphor prepared from xerogel.
Figure 2A:
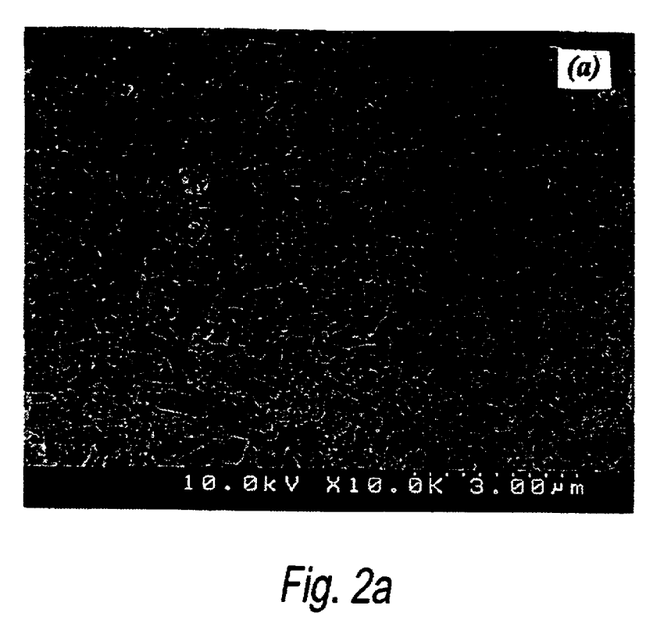
Figure 2B:
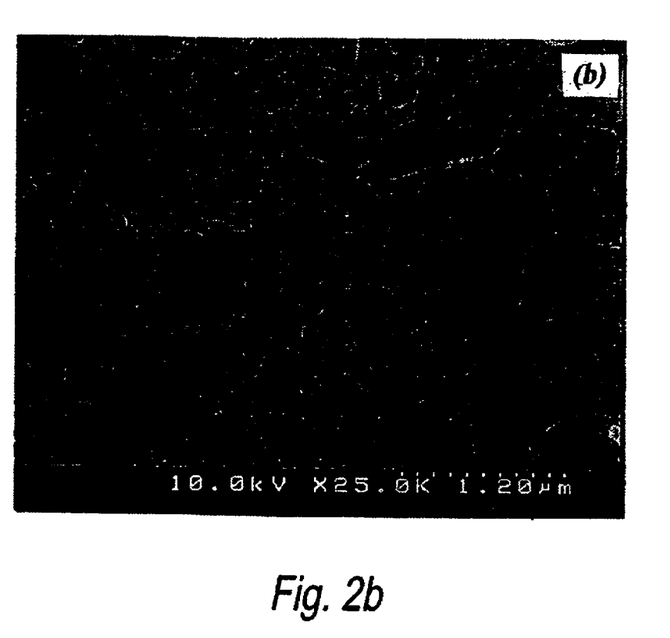
Figure 2C:
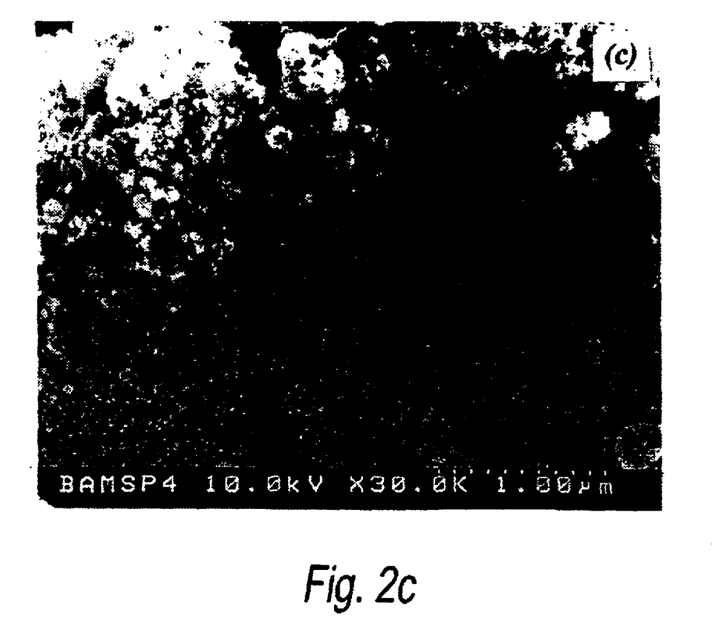
Figure 2D:
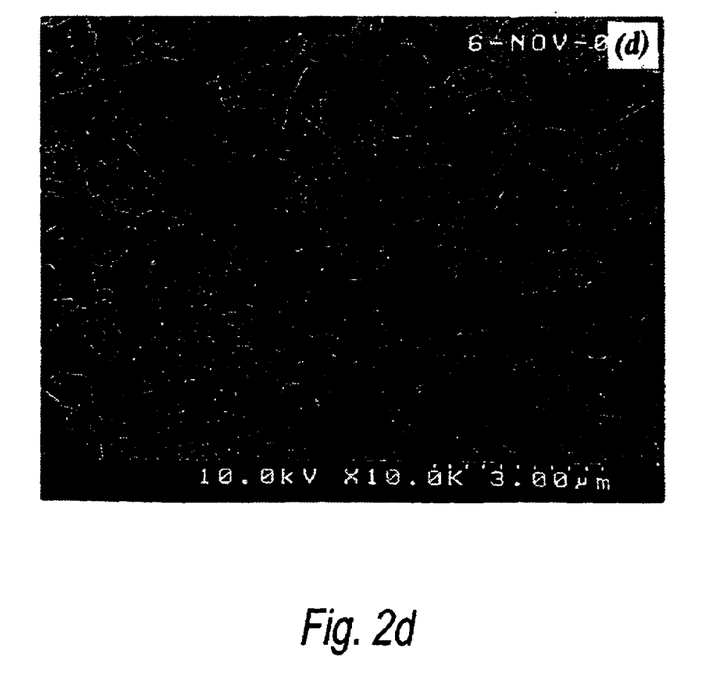

X-ray powder diffraction data on samples fired at 1000° C. and refired at 1100° C. ($N_2+H_2$) is shown in FIG. 1. Since the luminescence of a phosphor depends on the shape, size, crystallinity, defects and grain boundaries, the morphology and particle size distribution (PSD) of all the samples prepared at various conditions were studied. Scanning electron micrographs of phosphor samples prepared at various conditions are shown in FIG. 2. From the photomicrographs, one can observe that the phosphor particles are very uniform in size. The emission characteristics of these phosphors are carried out on compacted powders and also screen printed circular discs with phorphor at room temperature.

Figure 3:
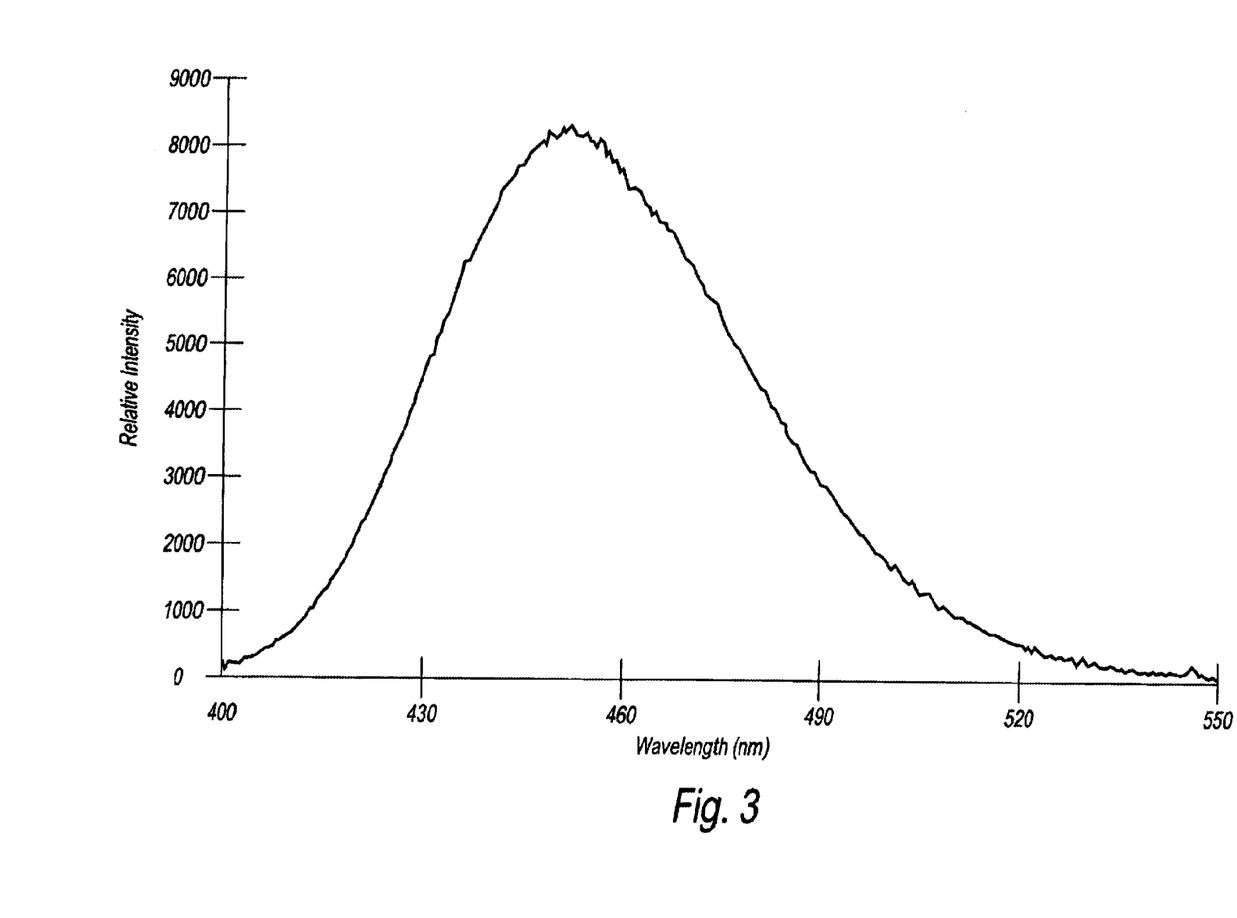
FIG. 3 shows emission spectra of $Eu^{2+}$ activated barium magnesium aluminate phosphor of present invention prepared from aerogel excited at 147 nm or 173 nm. The emission was recorded at room temperature.

The emission spectrum of $Eu^{2+}$ activated barium magnesium aluminate phosphors prepared from metal nitrates recorded at room temperature under VUV excitation (147 nm or 173 nm) is shown in FIG. 3.

Further details of this invention will be described with reference in the following examples.

EXAMPLE I

The preparation of BAM phosphor in an acid catalyzer by a sol-gel process is described in this example. First, 20.4 grams of aluminum isopropoxide (AIP) is dissolved in 4 liters of hot water (95° C.) while stirring. Then 2.35 grams of barium nitrate, 1.48 grams of magnesium nitrate and 0.446 grams of europium nitrate are added to the AIP solution. When the solution reaches 110° C., 5 cc HCl (0.5 mol) is added drop wise and refluxed for 24 hours. A water condenser column is maintained at 20° C. throughout the reflux by use of a circulating chiller. After cooling the flask to room temperature, the solution (dilute gel) is transferred into crystallizing dishes (3L capacity) and left in an open atmosphere. After 5 to 6 days, the solution becomes a gel.

These transparent hard gels are left at 45 to 50° C. for 12 hours in a lab oven. The dried product appears like soft glass, called xerogel. After crushing the gel in a glass mortar and pestle, a fine powder is collected into a high-grade alumina boat and fired at 400° C. for 2 hours (rate of heating is 2°/min.) and then 900 to 1000° C. for 3 to 6 hours, with the same rate of heating, in a box furnace. Samples are re-fired in a forming gas (5%$H_2$+95%$N_2$) at 1000 to 1100° C. for 2 to 4 hours in a tube furnace. The samples are left in the furnace until they cool down to room temperature.

After cooling, these fine phosphor powders are subjected to ultrasonic agitation in water. Ultrasonic treatment helps to break the clusters into very small particles. After washing with water, powders are dried at 100° C. for 6 hours. Depending upon the required amounts, this can be scaled up.

The emission characteristics of the above phosphor recorded at room temperature exciting with excitation VUV and PSD are given in Table I.

EXAMPLE II

The preparation procedure is the same as in example I except 20.4 grams of aluminum isopropoxide is replaced by 26.4 grams of aluminum s-butoxide.

EXAMPLE III

The preparation procedure is the same as in example I except 3.92 grams of barium nitrate is replaced by 3.18 grams of strontium nitrate.

EXAMPLE IV

The preparation procedure is the same as in example II except 3.18 grams of strontium nitrate is replaced by 3.54 grams of calcium nitrate.

EXAMPLE V

Synthesis of diluted gels from alkaline earth nitrate, europium nitrate and aluminum isopropoxide or aluminum s-butoxide in an acid medium is the same as described in Example I. Gel solutions obtained are subjected to freeze drying under vacuum. A cold trap is introduced between the vacuum pump and vacuum jar with gel. Dried powder is collected after a few hours of freeze drying at the bottom of the flask. These powders are subjected to calcination, cooling, washing and measurements as described in Example I.

EXAMPLE VI

Synthesis of diluted gels from alkaline earth nitrate, europium nitrate and aluminum isopropoxide or aluminum s-butoxide in an acid medium is the same as described in Example I. These diluted gels are sprayed through a nebulizer in a 4" diameter glass tube, with a 12" heating zone at 120 to 150° C. Fine particles can also be produced using an ultrasonic aerosol generator. After spraying about a liter of dilute gel, very fine powder is collected from the walls of the tube. These powders are subjected to calcination, cooling washing and measurements as described in Example I.

EXAMPLE VII 30 grams of aluminum oxide dust (0.01 to 0.02 microns), 11.5 grams of barium nitrate, 0.82 grams of europium nitrate and 1 gram lithium nitrate (flux) are mixed and transferred to high-grade alumina boats. These powders are subjected to calcination, cooling, washing and measurements as described in Example I.

TABLE I

Luminescence Characteristics and Morphology of
$Eu^{2+}$ ctivated Barium Magnesium Aluminate Phosphors

| Method of Prearation | Relative Intensity (AU) @ Excitation | | Half Width | Color Coordinates | | Particle Size |
| --- | --- | --- | --- | --- | --- | --- |
| | 147 nm | 173 nm | nm | x | y | ($\mu$m) |
| Xerogel (Ex-I) | 100 | 102 | 54 | 0.1535 | 0.0731 | 0.1–3.0 |
| Aerogel (Ex-V) | 104 | 105 | 53 | 0.1612 | 0.0805 | 0.1–2.0 |
| Spray (Ex-VI) | 90 | 90 | 54 | 0.1578 | 0.0715 | 0.05–1.0 |
| Sold St. (Ex-VII) | 96 | 97 | 55 | 0.1541 | 0.0742 | 1.0–6 |

As the data of Table I demonstrates, the phosphors formed by sol-gel processes and solid-state reaction of the present invention, provide various particle size ranges, while also generally providing a higher level of brightness.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for producing a divalent europium activated alkaline earth aluminate phosphor complex having the empirical formula:

$$(AE_{2-x-y}La_xEu_y)Al_{10}O_{17}$$

wherein $0 \leq x \leq 1$; $0.01 \leq y \leq 0.1$; La is lanthanum; Eu is divalent europium; Al is aluminum; AE is alkaline earth metal selected from the group consisting of Ba, Sr, Ca, Mg; said method comprising the steps of:

contacting in an aqueous acidic solution, an organic precursor providing a source of aluminum, a source of alkaline earth metal, a source of europium, and optionally a source of lanthanum to form a gel;

converting said gel into a gel powder; and thermally decomposing said gel at a temperature below a solid state reaction temperature to produce said phosphor complex.

2. The method of claim 1, wherein said source of europium is selected from the group consisting of europium nitrate and europium hydroxide.

3. The method of claim 1, wherein said source of alkaline earth metal is selected from the group consisting of alkaline earth nitrates and alkaline earth hydroxide.

4. The method of claim 1, wherein said organic precursor providing a source of aluminum is selected from the group consisting of aluminum isopropoxide and aluminum s-butoxide.

5. The method of claim 1, wherein said lanthanum is selected from the group consisting of lanthanum nitrate and lanthanum hydroxide.

6. The method of claim 1, wherein said gel is thermally decomposed in an open atmosphere at a temperature about 900° C. to about 1200° C. and then at a temperature about 1000° C. to about 1200° C. in forming gas to reduce $Eu^{3+}$ to $Eu^{2+}$.

7. The method of claim 1, wherein said gel is dried to form a xerogel and said xerogel is crushed to form a powder prior to thermal decomposition.

8. The method of claim 1, wherein said gel is vacuum dried to form an aerogel powder prior to thermal decomposition.

9. The method of claim 1, wherein said gel is spray dried to form a gel powder prior to thermal decomposition.

10. The method of claim 1, wherein said gel is sprayed ultrasonically and dried to form a gel powder prior to thermal decomposition.

11. The method of claim 7, wherein said phosphor complex has a particle size from about 0.1 to about 3.0 microns.

12. The method of claim 8, wherein said phosphor complex has a particle size from about 0.1 to about 2.0 microns.

13. The method of claim 9, wherein said phosphor complex has a particle size from about 0.05 microns to about 1.0 microns.

14. The method of claim 1, wherein said phosphor complex comprises from about 1.9 moles to about 1.99 moles of alkaline earth metal, from about 0.01 moles to about 0.1 moles of europium, and about 10.0 moles of aluminum.

15. The method of claim 1, wherein said alkaline earth metal is from alkaline earth nitrate, said europium is from europium nitrate, and said organic precursor providing a source of aluminum is aluminum isopropoxide.

16. The method of claim 1, wherein said alkaline earth metal is from alkaline earth nitrate, said europium is obtained from europium nitrate and said organic providing a source of aluminum is aluminum s-butoxide.

17. The method of claim 1, wherein said source of europium is europium hydroxide, said alkaline earth metal is selected from alkaline earth hydroxides, and said organic precursor providing a source of aluminum is aluminum isopropoxide.

18. The method of claim 1, wherein said source of europium is europium hydroxide, said alkaline earth metal is selected from alkaline earth hydroxides, and said organic precursor providing a source of aluminum is aluminum s-butoxide.

19. The method of claim 1, wherein said gel is thermally decomposed in an open atmosphere at a temperature of about 1000° C. and then at a temperature of about 1100° C. in forming gas to reduce $Eu^{3+}$ to $Eu^{2+}$.

20. The method of claim 1, wherein said alkaline earth Metal is from alkaline earth nitrate, said europium is from europium nitrate, said organic precursor providing a source of aluminum is aluminum s-butoxide, and said particle size of said phosphor complex is from about 0.1 microns to about 3.0 microns.

21. The method of claim 1, wherein said source of europium is europium hydroxide, said alkaline earth metal is selected from alkaline earth hydroxides, said organic precursor providing a source of aluminum is aluminum isopropoxide, and said particle size of said phosphor complex is from about 0.1 microns to about 2.0 microns.

22. The method of claim 1, wherein said source of europium is europium hydroxide, said alkaline earth metal is selected from alkaline earth hydroxides, said organic precursor providing a source of aluminum is aluminum s-butoxide, and said particle size of said phosophor complex is from about 0.05 microns to about 1.0 microns.

23. The method of claim 1, wherein said phosphor complex comprises from about 1.9 moles to about 1.99 moles of alkaline earth metal, from about 0.01 moles to about 0.1 moles of europium, and about 10.0 moles of aluminum.

24. A divalent europium activated alkaline earth aluminate phosphor complex having the empirical formula:

$$(AE_{2-x-y}La_xEu_y)Al_{10}O_{17}$$

wherein $0 \leq x \leq 1$; $0.01 \leq y \leq 0.1$; La is lanthanum; Eu is divalent europium; Al is aluminum; AE is alkaline earth metal selected from the group consisting of Ba, Sr, Ca, Mg; wherein said phosphor complex exhibits the following luminescent and morphological properties: relative intensity (AU) at 147 nm excitation from about 90 to about 100 and relative intensity (AU) at 173 nm excitation from about 90 to about 105 with half width from about 53 to about 55 nm; color coordinates of x from about 0.1535 to about 0.1612 and y from about 0.0715 to about 0.0805; and particle size from about 0.05 microns to about 3.0 microns.

25. A divalent europium activated alkaline earth aluminate phosphor complex having the empirical formula:

$$(AE_{2-x-y}La_xEu_y)Al_{10}O_{17}$$

wherein $0 \leq x \leq 1$; $0.01 \leq y \leq 0.1$; La is lanthanum; Eu is divalent europium; Al is aluminum; AE is alkaline earth metal selected from the group consisting of Ba, Sr, Ca, Mg; wherein said phosphor is prepared by a method comprising the steps of:

contacting in an aqueous acidic solution, an organic precursor providing a source of aluminum, a source of alkali earth metal, a source of europium, and optionally a source of lanthanum to form a gel;

converting said gel into a gel powder; and thermally decomposing said gel at a temperature below a solid state reaction temperature to produce said phosphor complex.

26. The phosphor complex of claim 25, wherein said source of europium is selected form the group consisting of europium nitrate, europium alkali earth metal is selected from the group consisting of alkali earth nitrates, alkali earth hydroxides, and mixtures thereof; said source of aluminum is selected form the group consisting of aluminum isopropoxide, aluminum s-butoxide, and mixtures thereof; said lanthanum is selected from the group consisting of lanthanum nitrate and lanthanum hydroxide.

27. The phosphor complex of claim 25, wherein said gel is thermally decomposed in an open atmosphere at a temperature from abut 900° C. to about 1000° C. and then at a temperature from about 1000° C. to about 1200° C. forming gas to reduce $Eu^{3+}$ to $Eu^{2+}$.

28. The phosphor complex of claim 25, wherein said gel is dried to form said gel powder prior to thermal decomposition.

29. The phosphor complex of claim 25, wherein said gel is vacuum dried to form said gel powder as an aerogel prior to thermal decomposition.

30. The phosphor complex of claim 25, wherein said gel is spray dried to form said gel powder prior to thermal decomposition.

31. The phosphor complex of claim 25, wherein said phosphor complex has a particle size from about 0.05 microns to about 3.0 microns.

* * * * *